United States Patent [19]

Van Breemen

[11] Patent Number: 4,871,189
[45] Date of Patent: Oct. 3, 1989

[54] TRUCK CAB SUSPENSION SYSTEM

[76] Inventor: Charles A. Van Breemen, 825 Evergreen St., Burbank, Calif. 91505

[21] Appl. No.: 90,571

[22] Filed: Aug. 28, 1987

[51] Int. Cl.$^4$ ..................... B60G 17/04; B60G 13/10; B62D 25/00
[52] U.S. Cl. ................................ 280/711; 180/89.12; 280/714
[58] Field of Search ................. 180/89.12, 89.1, 89.16, 180/89.19, 89.14; 296/35; 280/711, 714

[56] References Cited

U.S. PATENT DOCUMENTS

| | | | |
|---|---|---|---|
| 2,708,134 | 5/1955 | Sewelin et al. | 296/35.1 |
| 2,790,650 | 4/1957 | Boschi | 280/711 |
| 2,848,248 | 8/1958 | Hansen et al. | 280/711 |
| 2,885,243 | 5/1959 | Fiel et al. | 296/35.1 |
| 2,998,264 | 8/1961 | Stump | 280/711 |
| 3,010,757 | 11/1961 | DeHaan | 296/35.1 |
| 3,051,259 | 8/1962 | Lorenz | 180/89.14 |
| 3,129,973 | 4/1964 | Maruhn | 296/35.1 |
| 3,177,032 | 4/1965 | Jaskowiak | 296/35.1 |
| 3,276,812 | 10/1966 | Fisher | 296/35.1 |
| 3,361,444 | 1/1968 | Harbers | 280/106.5 |
| 3,606,437 | 9/1971 | Pierce | 296/35.1 |
| 3,667,565 | 6/1972 | Gerlingen et al. | 180/89.15 |
| 3,841,694 | 10/1974 | Merkle | 296/35.1 |
| 3,944,017 | 3/1976 | Foster | 180/89.15 |
| 3,980,316 | 9/1976 | Yates | 280/711 |
| 4,203,499 | 5/1980 | Miyata | 296/35.1 |
| 4,206,934 | 6/1980 | McKee | 280/711 |
| 4,470,477 | 9/1984 | Marjoram | 296/35.1 |

Primary Examiner—Richard A. Bertsch

[57] ABSTRACT

The present invention relates to a suspension means for supporting the cab of a truck cab on a truck chassis frame. More particularly, it relates to a means of fine tuning the frequency response of the spring mass system to isolate all of the modes of the frame and still control hard jounces. The suspension includes air springs, an air reservoir, an hydraulic shock absorber, and height control valve. An air reservoir serves to lower the spring rate of the air spring, and an orifice causes nonlinear air damping of the system.

12 Claims, 3 Drawing Sheets

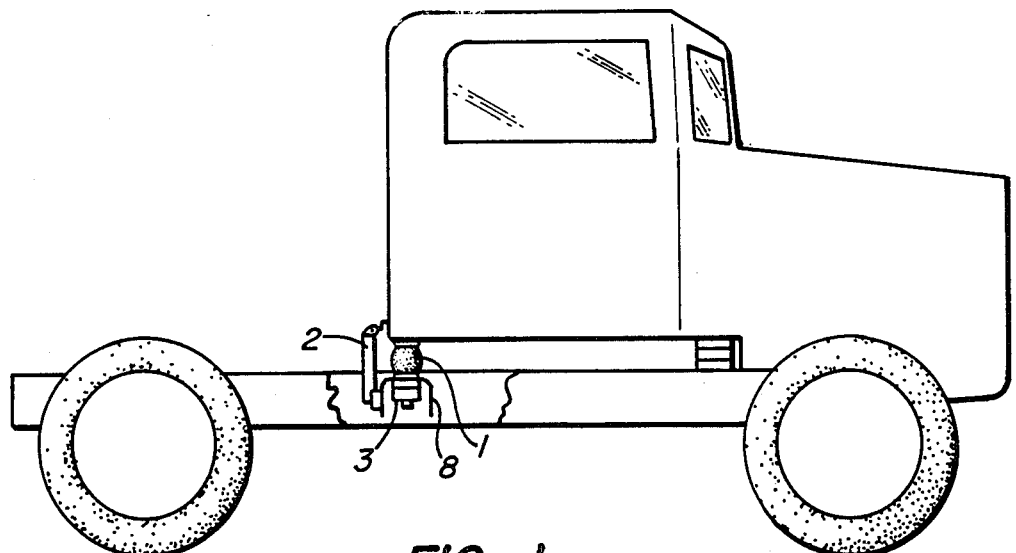
FIG._1
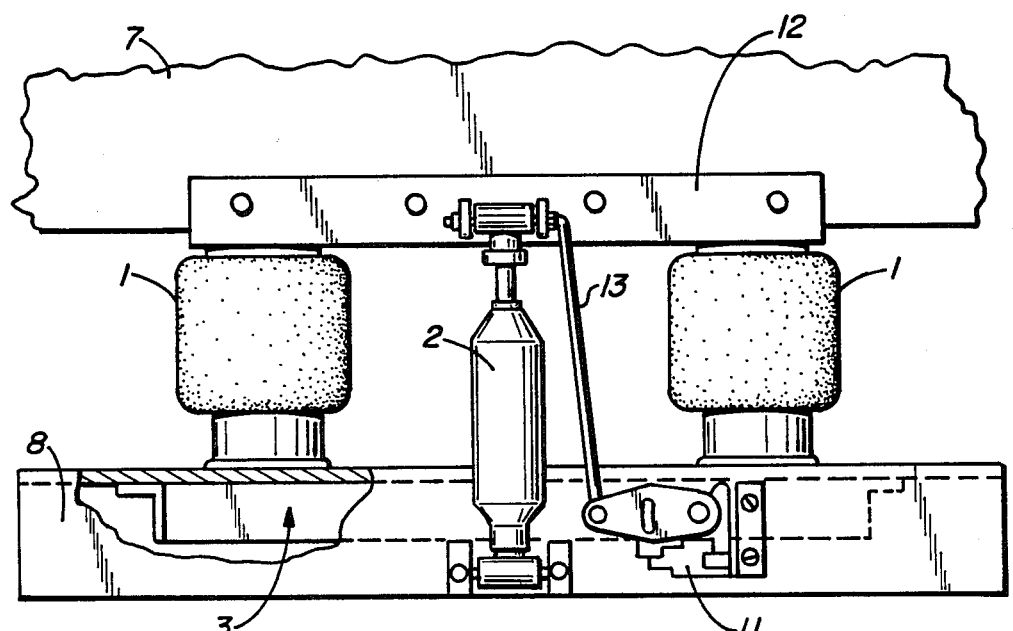
FIG._2

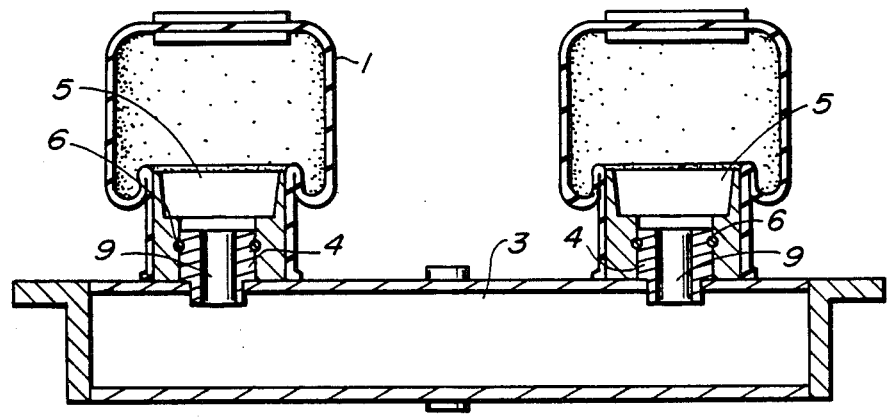
FIG._3
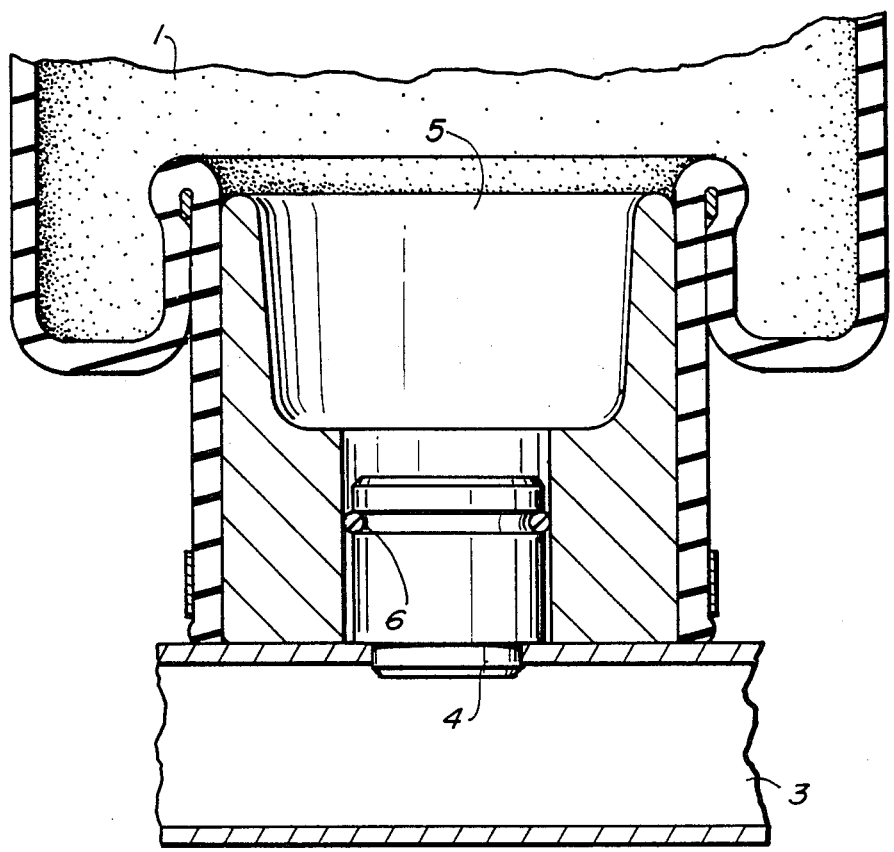
FIG._4

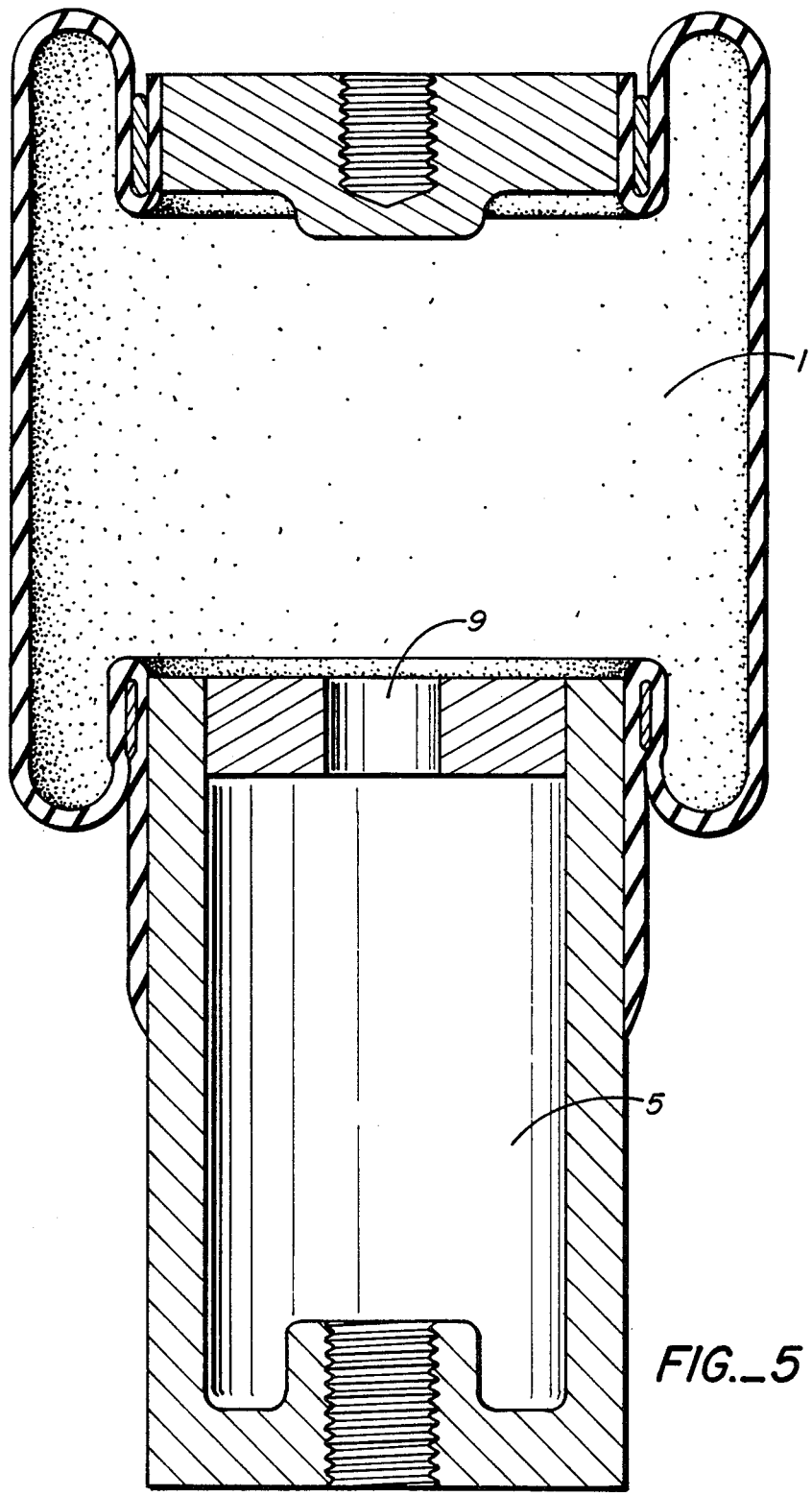
FIG._5

TRUCK CAB SUSPENSION SYSTEM

BACKGROUND OF THE INVENTION

The invention relates to an air spring mounting system for truck cabs, and more specifically to the means of fin tuning the spring rate, damping, and load capacity of the air springs used to resiliently mount the cab onto the chassis of a truck.

Trucks have for a long time been considered to be unacceptable in terms of vibration levels in the cab. There have been two areas for concern here, the comfort and health of the driver, and increased maintenance costs caused by high vibration levels. The source of the vibration is not so much road induced shock as it is free vibration of the frame excited by wheel imbalance and other driving forces.

Present day trucks are necessarily fitted with quite flexible frames, and the result is that, the frame has many modes between 3 and 12 Hertz. This not only causes high vibration levels in the cab, but also complicates the job of isolating the cab. To isolate the vibration, the suspended mass system must have a natural frequency, which is less than the lowest natural frequency of the frame divided by 2 times the square root of 2. This the lowest natural frequency of the frame. This requires very low spring rates, and the resultant large sway space allowance is not acceptable for most installations. A large sway space is not needed for most vibrations, but must be allowed for in case hard bumps are encountered. And most air springs have insufficient volume to achieve the needed low frequencies.

Heretofore designers have used only approximately the correct volume of air, and corrected for this with the use of multiple strong hydraulic shock absorbers to control sway during resonance, which may be driven by a near by frame mode. This then has a detrimental effect on the quality of ride achieved and on the life of the shock absorber.

Another design has used long thin air springs in a effort to increase the air volume in the spring. This has led to unstable springs which collapse frequently.

Additionally, the space available for installation of the air spring suspension system is generally quite restricted. This makes a small air spring desirable, but small springs lack the necessary load capacity and air volume. Some previous designs use two springs, but then the desirable three point mounting arrangement is defeated, and the spring rate is increased to the detriment of the isolation.

SUMMARY OF THE INVENTION

The above problems are solved by the invention the merits of which will become apparent from the description below.

It is the object and advantage of this invention to provide a means to improve the ride of a truck by lowering the spring rate of the air spring cab suspension system to any desired value by adding a volume of air in an air reservoir to the air spring.

It is also the object and advantage of this invention to improve the system response and reduce the work done by the hydraulic shock absorber by providing a system which has nonlinear air damping.

Additionally it is the object and advantage of this invention to provide the possibility to use multiple air springs which work as one and therefore preserve the desirable three point mounting system.

Readers will find further objects and advantages of the invention from a consideration of the ensuing description and the accompanying drawings.

BRIEF DESCRIPTION OF THE DRAWINGS

FIG. 1 is a partial side view of a vehicle employing the invention, with portions cut away to show the air spring.

FIG. 2 is a view of one embodiment, with portions of the truck frame cut away to show parts of the air reservoir.

FIG. 3 is a cross-sectional view of two air springs and an air reservoir, showing the relationship thereof.

FIG. 4 is a partial cross-sectional view of an air spring and air reservoir with interconnection.

FIG. 5 is a view of an alternate embodiment, wherein the air reservoir and orifice are a part of the air spring end.

DETAILED DESCRIPTION OF PREFERRED EMBODIMENT

Referring to the drawings wherein like characters indicate like parts throughout the figures;

Shown in FIG. 1 is a typical truck with an air spring in accordance with the invention installed. The assembly comprises two air springs, 1; air reservoir, 3; and an hydraulic shock absorber, 2; installed on the frame member, 8; generally in place of the usual rubber pad. FIG. 2 shows the air springs, 1; are disposed between the cab, 7; and the frame member, 8; attached by the upper bracket, 12; with an air reservoir, 3; disposed immediately beneath the air springs, 1. An hydraulic shock absorber, 2; is connected between the cab, 7; and the frame, 8; to damp resonant vibration. And an height control valve, 11; controls the pressure in the air springs, 1; by sensing the height of the cab, 7; through a link rod, 13.

FIG. 3 shows how air is free to pass between each air spring, 1; and the reservoir, 3; through an orifice, 9; in cylindrical protrusions 4 which are part of the air reservoir 3. The air springs 1, thus can communicate with each other and therefore act as one spring. The degree of communication between the air springs 1 and the air reservoir 3, because of friction in the orifice 9, varies nonlinearly with frequency and amplitudes of the vibrations. Therefore during normal operation, almost all of the volume of the reservoir 3 is available to the air spring 1, but when the velocity is large, as from a hard bump, a very small volume of the reservoir 3 is available to the air spring 1. This causes an effective increase in spring rate during shock loading and tends to limit deflections under these conditions.

The method of engagement of the cylindrical protrusions 4 with the end of the air spring 5 is shown in FIG. 4. The air spring end 5 has a smooth bore suitable for the O-ring seal 6 to seal against, the cylindrical protrusion 4 has a groove around its circumference to accept the O-ring seal 6 and fits closely into the bore of the air spring end 5.

FIG. 5 shows an alternate embodiment wherein the air spring end 5, contains the air reservoir and disposed between the air spring and reservoir is an orifice. This unit works in exactly the same way as the previously discussed embodiment, but may be more convenient for some uses.

THEORY OF OPERATION

The volume of air necessary for the correct spring rate is governed by the following relationship.

The natural frequency $f_n$ of an air spring system is given as:

$$f_n = \frac{1}{2\pi} \sqrt{\frac{ng}{L_2}}$$

where:
n is the polytropic exponent for air,
g is the gravitational constant, and
$L_2$ is the effective length of the column of air and is defined:

$$L_2 = \frac{f_n^2 ng}{4\pi^2}$$

and:

$V = L_2$ (effective area of spring)

where: V is the required volume.

The volume of air to be added can be calculated using the above relationship or it can be determined empirically. But, to work, the volume of air in the air reservoir 3 must be quite closely located to the air spring 1.

In this invention the air reservoir 3 is located immediately adjacent to the air spring 1. The air spring 1 and the air reservoir 3 are connected by a cylindrical protrusion 4 from the air reservoir 3 which engages a bore in the air spring end 5, and having a sealing means 6, such as an O-ring. The cylindrical protrusion 4 has an orifice 9 which forms a passage for the air between the air spring 1 and the air reservoir 3. The orifice 9 is sized to provide a restriction to the free flow of air between the air spring 1 and the air reservoir 3. The orifice 9 and the air reservoir 3 form a nonlinear air damped system, which is dependent on both amplitude and frequency, and is governed by the relationship below:

$$c_p = \frac{k_p T}{(\omega T)^2}$$

where:
$c_p$ = equivalent viscous damping coefficient.
$k_p$ = pneumatic spring rate.
T = time constant.
$\omega$ = natural frequency.

At higher frequencies and small amplitudes (such as smooth road vibrations) little damping effect exists, but when a low frequency high amplitude input is encountered (such as a bump) the damping effect is large. thus the air damping changes the system response so as to prevent bottoming of the system on hard bumps, and reduces the need for an hydraulic shock absorber.

In the case where it is desirable to use more than one each such air spring 1, and the volume of the air reservoir 3 is increased proportionally. All of the air springs 1 sharing the same air reservoir 3 act together as one spring thus preserving the single point of action necessary if the system is to be one point of a three point system.

While two preferred embodiments of the invention have been described, and those skilled in the art will envision many possible variations, it is to be understood that such description is merely illustrative of the underlying principles of the invention and is not intended to be limiting of the scope of the invention and the following claims.

What I claim is:

1. A truck cab gas suspension system which comprises:
   (a) at least one gas spring,
   (b) a gas reservoir,
   (c) said gas reservoir being closely connected to said gas spring by interconnecting means, said interconnecting means being sealed to prevent gas leakage from said system by a sealing means, and having means for restricting the flow of gas, interposed between said gas spring and said gas reservoir; such that the spring rate of said gas spring is lowered by the additional gas volume in said gas reservoir, and the free vibrations of the cab suspension system are damped by nonlinear gas damping, and wherein said reservoir stays in communication with said gas spring independent of the displacement said spring is subjected to.

2. The invention of claim 1 wherein, said interconnecting means is a cylindrical protrusion from said gas spring which engages a hole in said gas reservoir.

3. The invention of claim 1 wherein, said interconnecting means is a cylindrical protrusion from said gas spring which engages a hole in said gas reservoir.

4. The invention of claim 1 wherein, said sealing means is an O-ring seal.

5. The invention of claim 1 wherein, the gas restricting means is an orifice in said interconnecting means 6. The invention of claim 1 wherein, said gas reservoir forms a portion of the truck frame.

7. The invention of claim 1 wherein, a portion of the truck frame is interposed between said gas reservoir, and said gas spring, and said interconnecting means passes through holes in the frame member.

8. A truck cab gas suspension system which comprises:
   (a) at least one gas spring;
   (b) said gas spring having a gas reservoir which forms one end of said gas spring, and having an orifice for restricting the free flow of gas, interposed between said gas spring and the reservoir, such that the effective spring rate of said gas spring is lowered by the additional volume of gas in said gas reservoir, and the free vibrations of the cab suspension system are damped by nonlinear gas damping, and wherein the size of said orifice is independent of spring displacement.

9. The invention of claim 8 further comprising a second gas spring connected to said gas reservoir, an orifice being formed between said reservoir and said second gas spring for restricting the free flow of gas therebetween, such that the effective spring rate of said second gas spring is lowered by the additional volume of gas in said gas reservoir.

10. Apparatus comprising:
    (a) a first gas spring;
    (b) a second gas spring;
    (c) a reservoir in communication with said first and second said gas springs, said first gas spring comprising a first orifice for restricting the free flow of gas, interposed between said first gas spring and said reservoir, said second gas spring comprising a second orifice for restricting the free flow of gas, interposed between said second gas spring and said reservoir, such that the effective spring rate of said first and second gas springs is lowered by the additional volume of the gas in said gas reservoir, and free vibrations applied to said gas springs are damped by nonlinear gas damping.

11. Apparatus comprising:
(a) at least one gas spring,
(b) a gas reservoir,
(c) said gas reservoir being closely connected to said gas spring by interconnecting means, said interconnecting means being sealed to prevent gas leakage from said system by a sealing means, and having means for restricting the flow of gas, interposed between said gas spring and said gas reservoir; such that the spring rate of said gas spring is lowered by the additional gas volume in said gas reservoir, and free vibrations applied to said gas spring are damped by nonlinear gas damping, and wherein said reservoir stays in communication with said gas spring independent of the displacement said spring is subjected to.

12. Apparatus comprising:
(a) at least one gas spring;
(b) said gas spring having a gas reservoir which forms one end of said gas spring, and having an orifice for restricting the free flow of gas, interposed between said gas spring and the reservoir, such that the effective spring rate of said gas spring is lowered by the additional volume of gas in said gas reservoir, and free vibrations applied to said spring are damped by nonlinear gas damping, and wherein the size of said orifice is independent of spring displacement.

* * * * *

REEXAMINATION CERTIFICATE (3465th)
United States Patent [19]
Van Breemen

[11] B1 4,871,189
[45] Certificate Issued Mar. 17, 1998

[54] TRUCK CAB SUSPENSION SYSTEM

[76] Inventor: Charles A. Van Breemen, 825 Evergreen St., Burbank, Calif. 91505

Reexamination Request:
No. 90/004,398, Oct. 2, 1996

Reexamination Certificate for:
Patent No.: 4,871,189
Issued: Oct. 3, 1989
Appl. No.: 90,571
Filed: Aug. 28, 1987

[51] Int. Cl.$^6$ ............ B60G 17/04; B60G 13/10; B62D 25/00
[52] U.S. Cl. ............ 280/711; 140/89.12; 280/714
[58] Field of Search ............ 180/89.1, 89.12, 180/89.13, 89.14, 89.15, 89.16, 89.17, 89.18, 89.19; 296/35.1, 35.2, 35.3; 280/711, 714

[56] References Cited

U.S. PATENT DOCUMENTS

| | | | |
|---|---|---|---|
| 3,374,981 | 3/1968 | Stuckenberger et al. | 248/565 |
| 3,405,901 | 10/1968 | Gregoire | 248/567 |
| 3,628,763 | 12/1971 | Auer | 248/565 |
| 3,788,628 | 1/1974 | Hotz, Jr. et al. | 267/64.24 |
| 3,889,936 | 6/1975 | Shimizu | 267/64.23 |
| 4,854,555 | 8/1989 | Ohkawa et al. | 267/64.24 |

FOREIGN PATENT DOCUMENTS

| | | |
|---|---|---|
| 1449913 | 8/1966 | France . |
| 1065669 | 9/1959 | Germany . |
| 1313745 | 5/1987 | U.S.S.R. . |

OTHER PUBLICATIONS

R.D. Cavanaugh, "Air Suspension and Servo–Controlled Isolation Systems", pp. 33–1 to 33–11, Shock and Vibration Handbook, 2nd ed. (1976).

Shock and Vibration Handbook, 2nd ed. (1976), pp. 1–18 to 1–21.

McGraw–Hill Encyclopedia of Science and Technology (1987), vol. 18, p. 331.

*Primary Examiner*—Kenneth R. Rice

[57] ABSTRACT

The present invention relates to a suspension means for supporting the cab of a truck cab on a truck chassis frame. More particularly, it relates to a means of fine tuning the frequency response of the spring mass system to isolate all of the modes of the frame and still control hard jounces. The suspension includes air springs, an air reservoir, an hydraulic shock absorber, and height control valve. An air reservoir serves to lower the spring rate of the air spring, and an orifice causes nonlinear air damping of the system.

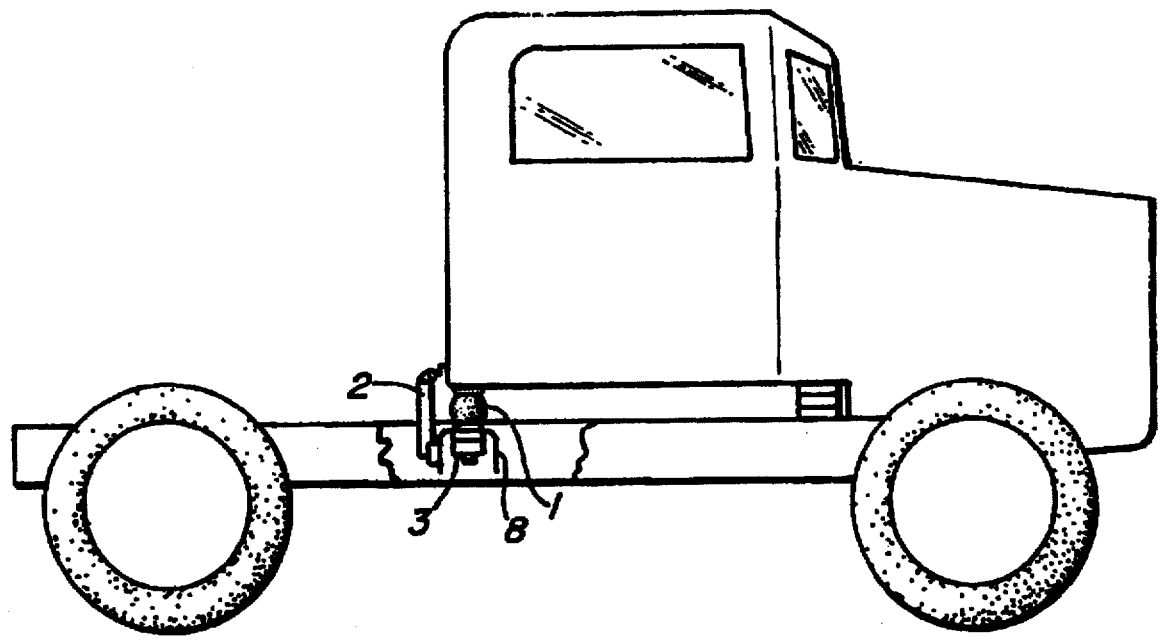

// B1 4,871,189

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6, 7, 9, 10 and 12 is confirmed.

Claims 1–5, 8 and 11 are cancelled.

* * * * *